Patented Nov. 19, 1935

2,021,222

UNITED STATES PATENT OFFICE 2,021,222

REFRACTORY MATERIAL

George D. Cain, Warren, Ohio, assignor to The Republic Steel Corporation, Youngstown, Ohio, a corporation of New Jersey No Drawing. Application November 17, 1933, Serial No. 698,536

3 Claims. (Cl. 106—9)

This invention relates to refractory materials, and more particularly to building, repairing or lining materials for apparatus, pots, and furnaces subjected to high temperatures, such as metallurgical furnaces.

Heretofore, refractories have been more or less definitely classified in three classes. The first of these classes is acid refractories which are particularly adapted to resist the scoring and corrosive action of acid material such as acid slag in metallurgical work. These acid refractories are generally employed for roofs or arches of high temperature furnaces in that they are particularly adapted to resist high temperatures although they do not satisfactorily resist serious fluxing reactions. Typical acid refractories are silica brick, chrysolite, sand and ganister.

The second type of refractory material is called the neutral type. Neutral refractories are adapted to resist the action of neutral substances which are neither basic nor acid. Typical neutral refractories include graphite, chromite, fire clay, carbon brick and the like and they are employed for example in a basic open hearth furnace as an interposed layer between the roof of an acid refractory and the hearth of a basic refractory. This interposed layer terminates ordinarily slightly above the hearth lined with basic material so that the molten contents of the furnace will not attack the neutral refractory. Moreover, if the basic and acid refractories are placed in contact with each other a reaction resulting in melting may occur.

The third class of refractories is that relating to basic refractory materials such as dolomite, which is a magnesian lime stone, periclase, magnesite, "Magnefer", which is a trade name for a calcined dolomite, etc. These basic refractories are employed for example in the hearth of the basic open hearth furnace where other refractories would be quickly scored and corroded by the basic slags.

From the foregoing it will be recognized that refractory materials heretofore had to be selected very carefully from the proper class and in view of the relation in which the same was to be employed in order to prevent premature scoring and corrosive action on the refractories and in order to eliminate frequent replacements.

For example, olivine which is a form of chrysolite, has been employed with some considerable success in the roof and upper side wall portions of open hearth furnaces. But this material has not proved satisfactory for use in the hearth portion of the same furnace. However, olivine is inexpensive and can be readily obtained from extensive deposits in the United States. Likewise certain other materials such as calcined dolomite and chromite (referred to in the trade as chrome-ore) are comparatively inexpensive and adapted to certain definite refractory uses as above described.

By the present invention the difficulties encountered heretofore in the use and replacement of refractory materials have been to a large extent avoided or eliminated by the provision of a new, novel and improved refractory material made from a plurality of known refractory materials combined in such a manner as to produce a substance which is adapted to resist corrosion and scoring under widely varying conditions. The improved refractory is capable of use in many relations and is long wearing and resistant in various installations thereby eliminating frequent replacements and repair.

The present invention contemplates combining a basic and acid and a neutral refractory in such a manner that the resulting material is possessed of certain characteristics of each of the individual constituents so that the improved refractory can be used for many purposes. More particularly the present invention comprises mixing olivine, chrome ore and calcined dolomite which may be in the form of "Magnefer". Olivine is a magnesian silicate of iron having a typical chemical formula $(MgFe)_2 SiO_4$. A common sample of olivine indicated the following general components (or elements which would form their equivalents): about 48% MgO, about 42% $SiO_2$, and about 10% FeO. The iron oxide content, FeO, may range from as low as 2 or 3% to as high as 20% in different grades of olivine.

The "Magnefer", or calcined dolomite, is essentially a mixture of oxides of lime and magnesium, altho impurities in the form of oxides of iron, aluminum and silica may be present. Pure dolomite substantially free from impurities is also obtainable and may be calcined to a mixture of CaO and MgO.

Chrome ore or chromite is a double oxide of iron and chromium and ordinarily includes a little gangue. The chemical formula is $FeOCr_2O_3$.

I have found that by mixing the foregoing refractory materials in certain definite relations and in a certain manner that a new and improved refractory material will result. The exact proportions in which the materials can be combined may vary considerably, however, a typical mixture consists of from 500 to 1500 pounds of olivine, 500 to 1500 pounds of "Magnefer"

and 500 to 1500 pounds of chrome ore. This ratio could be similarly expressed in parts for the production of smaller quantities. It has also been determined that the chrome ore can possibly be reduced in amounts so that the chromium oxide formed $Cr_2O_3$ would not exceed 5%. Thus approximately 500 pounds of chrome ore or chromite would be sufficient for a mixture of say 100 pounds of olivine and 1200 to 1400 pounds of "Magnefer".

An important part of the invention is the particular manner in which the refractories are mixed and this comprises crushing the olivine into finely divided particles which are ordinarily mixed with somewhat larger particles of "Magnefer" and chrome iron with sufficient water, water glass, or other liquid being added to make a pasty mixture. The small particles of the olivine react with the other materials when heated, either before or after installation in the furnace, without allowing the olivine to melt. This heating operation causes the olivine and "Magnefer" to react to form a stable dicalcium silicate and periclase which are bound together by the chrome ore which may now be wholly or in part in the form of chromium oxide.

The chrome ore is believed to function as a binder and stabilizer to simultaneously hold the olivine and "Magnefer" (or other calcined dolomite) together in a fused mass and to likewise stabilize the resulting mass by coating and penetration.

As a particular example of the relative sizes of the various constituents the "Magnefer" or other calcined dolomite may be passed thru a screen having about two meshes to the inch, the chrome ore thru about a 20 mesh screen and the olivine thru between a 10 and a 40 mesh screen. It has been found that it is inadvisable to have the olivine particles too large or small and this is particularly true when dolomite is used which contains impurities such as iron and aluminum oxides. These impurities tend to react chemically with finely ground olivine to form slag which destroys the character of the refractory. On the other hand if the olivine is too coarse the proper reaction does not occur between it and the pure dolomite and the chrome ore to produce the bonded periclase and stable dicalcium silicate of the present invention.

It will be appreciated that the mixture of materials can be made up in any form such as blocks, plates or bodies and that the same can be fused in separate kilns or furnaces and removed for use elsewhere or that the mixture can be applied in paste form to the article or in the convertor, pot or furnace in which it is to be used either as a lining or a repair patch.

While the invention has been described as comprising a mixture of olivine, chrome ore and "Magnefer" which are respectively acid, neutral and basic refractories it is within the scope of the invention to replace the specified materials with other materials from their general class which will function in a similar manner as the particular materials specified herein.

While the refractory material produced in accordance with the teachings of the present invention have been particularly described as adapted for use in metallurgical furnaces, for example an open hearth furnace, it is within the concept of the invention to employ the material in substantially any article or furnace subjected to high temperatures. The refractory can be made in the form of facings or linings or can be molded into blocks or other shapes. It will, therefore, be appreciated that the foregoing description has, in accordance with the patent statutes, specifically described certain forms and applications of the invention but that the scope of the invention is not to be limited thereby but is defined in the appended claims.

What I claim is:

1. A refractory consisting of between about 5 and 15 parts by weight of olivine containing about 48% MgO, 42% $SiO_2$ and 2 to 20% FeO, about 5 and 15 parts by weight of chromite containing $FeOCr_2O_3$ and about 5 and 15 parts by weight of calcined dolomite containing CaO and MgO.

2. An all purpose refractory consisting of about 10 parts by weight of olivine containing about 48% MgO, 42% $SiO_2$ and 2 to 20% FeO, about 12 to 14 parts by weight of calcined dolomite containing CaO and MgO and about 5 parts by weight of chromite containing $FeOCr_2O_3$.

3. A refractory consisting of between about 5 and 15 parts by weight of olivine containing about 48% MgO, 42% $SiO_2$ and 10% FeO, about 5 and 15 parts by weight of chromite containing $FeOCr_2O_3$, and about 5 and 15 parts by weight of calcined dolomite.

GEORGE D. CAIN.